April 28, 1953   A. H. BROWN ET AL   2,636,430
APPARATUS FOR HEATING FLUIDS, PARTICULARLY FOODSTUFFS
Filed June 14, 1950

M. E. LAZAR
P. W. KILPATRICK
A. H. BROWN
INVENTORS

BY *L. M. Mantell*
ATTORNEY

Patented Apr. 28, 1953

2,636,430

UNITED STATES PATENT OFFICE 2,636,430

APPARATUS FOR HEATING FLUIDS, PARTICULARLY FOODSTUFFS

Amon H. Brown, El Cerrito, Paul W. Kilpatrick, Albany, and Melvin E. Lazar, Oakland, Calif., assignors to the United States of America as represented by the Secretary of Agriculture Application June 14, 1950, Serial No. 168,134

1 Claim. (Cl. 99—251)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the processing of heat-sensitive materials, in particular the invention relates to apparatus and methods for heating fluid foodstuffs, such heating being for the purpose, for example, of causing sterilization, pasteurization, enzyme inactivation, or evaporation of volatile components from, or concentration of, the foodstuffs. The principal object of this invention is to provide the apparatus and the technique whereby such processing can be performed rapidly and efficiently and without causing appreciable heat damage to the foodstuff. Further objects and advantages of the invention will be obvious from the description herein.

In the accompanying drawings, which are given merely by way of illustration:

Figure 1:
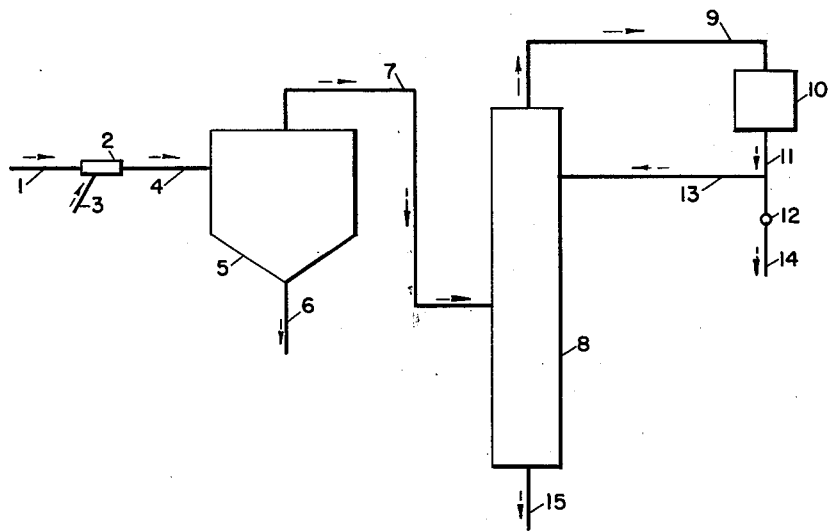
Fig. 1 represents diagrammatically one form of apparatus for carrying out our process.

Many methods and devices are known and used for the heating of liquid foodstuffs. The most common method is to heat the liquid in a vessel or heat-exchanger by indirect thermal contact, i. e., through a heat transfer surface, with steam or other hot medium. In such processes the rate of heating is relatively slow and the temperature throughout the food is not uniform. Since the heat must be applied through successive layers of the foodstuff it is obvious that the material nearest to the source of heat will be hotter than the material further away from the source of heat. Even if the foodstuff is impelled through the device by a pump, the same type of uneven heating will occur. In such case the liquid film which is close to the heated surface does not move rapidly, hence this portion of the liquid is heated to a higher temperature than the remainder of the liquid. As a result, development of cooked or off-flavors occurs because of the overheating of a portion of the material. This situation is of course aggravated with viscous foods or those which become viscous on heating, in which case the flow of the liquid near the heated surface is even more decreased by the increasing viscosity of the food. Although these problems have been before the industry for many years no successful solution has been reached prior to our invention.

We have now devised a system for heating foodstuffs which completely alleviates the problems outlined above. In brief our system involves, essentially, mixing the foodstuff with steam whereby the foodstuff is virtually instantaneously brought to the desired temperature. The hot mixture of foodstuff and steam is then discharged, after a very brief retention time, into an evaporation zone whereby the foodstuff is cooled and at the same time water derived from the added steam and from the foodstuff is evaporated.

The direct steam heating operation referred to briefly above involves simultaneously introducing the foodstuff and steam into a mixing zone. In this operation two factors contribute to the rapid heating of the foodstuff. One is that the foodstuff and steam are intimately admixed due to the turbulent flow conditions existing in the mixing zone. The other is that the steam and foodstuff are introduced in such proportion that at any instant, the increment of steam admitted is the amount of steam required to raise the simultaneously admitted increment of foodstuff to the desired processing temperature. In general, this proportion is about 0.1 lb. of steam per lb. of foodstuff for each 100° (F.) rise in temperature desired. By proceeding in such manner heating is virtually instantaneous thus the time required to bring each increment of foodstuff to the desired processing temperature is always less than one second and usually less than two-tenths of a second. After having been brought to the desired processing temperature the hot mixture is maintained at this temperature for a brief period of time, usually less than one second. This period may be increased or decreased by adjusting the volume of the zone in which the steam and foodstuff are commingled. Thus if the aim of the process is merely to heat the foodstuff, for example, to evaporate it, then the hot mixture may be discharged from the mixing zone immediately after the foodstuff is brought to the proper processing temperature. If the aim is to sterilize the foodstuff or to inactivate its enzymes, then the hot mixture may be maintained at the processing temperature for a brief period of time to accomplish such ends. In any case the hot mixture is then discharged into an evaporation zone whereby to obtain cooling and at least partial evaporation. This evaporation zone is usually operated under vacuum whereby to give a greater cooling and evaporating effect.

Various alternatives may be employed in our system. For example, the vapors evolved in the vacuum cooling step may be subjected to condensation, and/or distillation to recover volatile essences and these may be returned to the finished product. Such procedure is particularly advantageous in the treatment of fruit juices and purees which contain volatile flavoring constituents which are lost in most conventional heating procedures.

Another alternative is that the degree of vacuum and/or the temperature of the steam heating step may be so regulated as to get a variety of results. For example, if the product is merely to be pasteurized or sterilized the above conditions may be so regulated as to get little or no net evaporation of the original foodstuff during the vacuum step. On the other hand if it is desired to produce a concentrate then the conditions may be regulated so as to obtain a limited degree of concentration of the feed material upon release of the hot mixture into the vacuum chamber.

In general, the idea of direct heating with steam is not novel with us. However, the possibility of direct heating with steam of foodstuffs has not been adequately exploited mainly because it has not been properly applied nor has its advantages been realized. By applying direct heating with steam under the particular conditions herein described we are enabled to attain pasteurization, sterilization or similar processing treatments with shorter heating times and less heat damage to the product than heretofore available with any known technique or device. The actual heat damage is, in fact, negligible. This result would not have been anticipated on the basis of prior art in the field of heating and sterilization.

Some of the advantages of our apparatus and method over conventional systems are listed below:

In the first place, in our system the heating and cooling are both extremely rapid. Thus we are enabled to bring the foodstuff from room temperature up to temperatures of 300° F. or higher, depending upon the pressure of available steam, and back to room temperature in less than one second. This short time of retention of material at high temperature is an essential feature of our system and is the main reason why no appreciable heat damage occurs. Rapid heating, of course, contributes to short retention times. The final products produced in accordance with this invention have virtually the same flavor as the natural product.

Another point is that in our system, heating is uniform throughout the body of the foodstuff. This is so because the foodstuff and steam are mixed in a zone of turbulence where these materials are kept in intimate admixture and significant local over- or under-heating cannot occur. No metallic or other solid heat transfer surfaces are used.

Still another point in our system is that the materials so processed are deaerated, and in some cases, deodorized.

The system is extremely simple. The steam injection heater, the only pressure vessel in the system, need only have a volume of 5.0 cu. in. or less per hundred gallons an hour of processing capacity. Such a small heater is to be contrasted with the large steam-jacketed vessels or tubular or plate heat-exchangers now common in the food processing industry for the same capacity or rate of flow.

The steam injection heater contains no heat transfer surfaces and is therefore suitable for heating materials (pea puree, for example) which foul tubular or plate types of heaters. Vegetable purees which completely foul up a tubular heater in 10 minutes or less of operation can be handled for prolonged periods of operation with our injection heater without fouling.

Our system is very easily regulated to change over from one type of processing to another. By simple adjustment of the pressure of steam supplied to the heater and the degree of vacuum applied in the cooling step, the system can be changed from one suitable to pasteurization, to one suitable to sterilization, or to another suitable for partial concentration.

Another point is that in our system, provision is made for recovery of volatiles. By providing such equipment the volatile essences ordinarily lost in conventional practice can be recovered and returned to the product.

In Fig. 1 of the drawing annexed hereto is shown diagrammatically one form of apparatus for carrying out the process of this invention. The apparatus and its functions are described as follows:

The foodstuff to be processed is introduced through pipe 1 into injection heater 2. Simultaneously steam is introduced into heater 2 through pipe 3. In heater 2 these materials are thoroughly admixed by the turbulent conditions therein existing. The hot mixture then flows through pipe 4 into vapor separator 5. This separator is maintained under vacuum whereby an evaporation of the hot mixture occurs with simultaneous cooling thereof. The cooled product is withdrawn through pipe 6. The vapors from separator 5 flow through pipe 7 into distillation column 8. The overhead fraction involved in the distillation containing the volatile essences flows through pipe 9 into condenser 10. Part of the condensate may be returned to the column via pipe 11 and pipe 13, the reflux ratio being controlled by adjustment of valve 12. The remainder of the condensate is withdrawn through pipe 14 and is ready to be returned to the food product. The bottom fraction involved in the distillation, consisting only of water from which the volatile essences have been removed, is withdrawn through pipe 15 and discarded.

Figure 2:
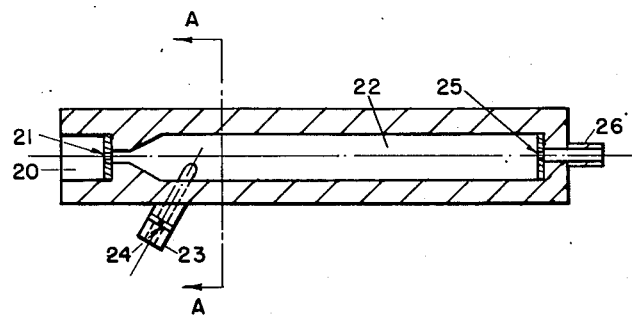
Fig. 2 represents a side elevation in cross section of the steam injection heater.
Figure 3:
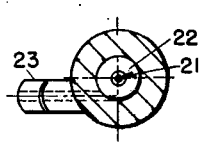
Fig. 3 represents a cross section of the steam injection heater taken along plane A—A of Fig. 2.

In Figs. 2 and 3 of drawing annexed hereto is shown in detail the steam injection heater 2 in accordance with this invention. This device and its functions are described as follows:

The foodstuff to be processed is pumped through inlet 20 and orifice 21 into mixing chamber 22. At the same time steam is introduced through inlet 23 and orifice 24 into mixing chamber 22. Inlet 23 is arranged so that the incoming steam meets the stream of liquid foodstuff at an acute angle and moreover inlet 23 enters the mixing chamber tangentially. Both of these factors cause the incoming stream of steam to take a spiral path in chamber 22 thereby creating turbulence with the result that the foodstuff and steam are intimately mixed. The hot mixture then flows through orifice 25 and outlet 26 and then into separator 5. Orifice 25 is necessary to maintain the pressure within chamber 22 above that corresponding to the vapor-liquid equilibrium pressure of the hot material in the chamber. Orifices or other flow-restricting devices are necessary to properly stage pressures to ensure condensation of the steam and stability in operation.

The following examples demonstrate the invention as applied to particular materials under particular conditions. It is understood that these examples are furnished only by way of illustration and not limitation.

The processes set forth in these examples were carried out in apparatus as hereinabove described. The steam injector unit had the following dimensions: mixing chamber 22, 6" long, ¾" inside diameter; orifice 21, .070" diameter; orifice 25, .0635" diameter; orifice 24, 0.173" diameter.

*Example I*

A lot of fresh orange juice was processed in the above-described apparatus for the purpose of sterilizing the juice and inactivating the enzymes therein. The vapor evolved from separator 5 was not recovered. A total of 13 gallons of the juice was processed at the rate of 25–30 gallons per hour. The temperature in mixing chamber 22 was 210° F.; the temperature in separator 5 was 76–78° F. corresponding to about 1" Hg absolute. The total elapsed time for each particle of juice to be heated from room temperature to 210° F. and then cooled to 76–78° F. was 1.5 seconds.

Samples of the processed juice were appraised for organoleptic qualities by a taste panel. It was found that no cooked or heated flavor could be detected and the product was judged to be equivalent to fresh juice.

A similar test was made in which the orange juice was heated to 290° F. A cooked taste in the product was barely perceptible.

*Example II*

In this case, the volume of the mixing chamber 22 was reduced by placing a stainless steel rod therein leaving an annular space of about 0.8 cu. inch total volume.

In order to test the efficiency of the process for sterilization, a lot of fresh apple juice was inoculated with the heat-resisting yeast, *Schizosaccharomyces octosporus*, in the amount of 20,000 organisms per milliliter of apple juice. The inoculum included spores of the organism as well as active cells. A total of 5 gallons of the inoculated juice was processed at the rate of 20 gallons per hour. The temperature in the mixing chamber 22 was 244° F.; the temperature in separator 5 was 84° F. corresponding to about 1" Hg absolute. The total elapsed time for each particle of juice to be heated from room temperature to 244° F. and then cooled to 84° F. was 0.7 second.

Samples of the processed juice were tested for their content of viable microorganisms. No living organisms were detected after culturing three 1-ml. samples of the processed juice on an apple juice-agar medium thus indicating that sterilization had been obtained.

Having thus described our invention, we claim:

An apparatus system for instant heat-sterilization of fruit juice without impairment of flavor, comprising: a pressure steam injection heater suitable for rapidly heating liquid foodstuffs which foul tubular or plate types of heaters, the injection heater comprising a cylindrical hollow chamber free from moving parts, and free from heater elements and baffles, the length of said chamber being at least several times its diameter, an inlet of restricted cross-section at one end of said chamber at the axis thereof for introducing a longitudinal, axial stream of liquid foodstuff into said chamber, an outlet of restricted cross-section at the opposite end of said chamber at the axis thereof for discharging heated material from said chamber, a lateral steam inlet communicating with said chamber and spaced a substantial distance from the foodstuff inlet, said steam inlet being positioned so that the entering steam is directed slightly toward the discharge end of the chamber and at an acute angle to the stream of liquid foodstuff and also tangentially to the inner cylindrical surface of the chamber whereby the incoming stream of steam takes an arcuate path in the chamber thereby creating turbulence and causing intimate mixing of the foodstuff and steam, and a vacuum flash chamber connected to the outlet of the heater in which the juice is quickly cooled, the volumetric capacity of the injection heater being at least several times less than that of the flash chamber, being comparatively small, whereby the sojourn of the hot mixture in the injection heater may be readily adjusted at about a second or less.

AMON H. BROWN.
PAUL W. KILPATRICK.
MELVIN E. LAZAR.

References Cited in the file of this patent

UNITED STATES PATENTS

| Number | Name | Date |
| --- | --- | --- |
| 1,952,281 | Ranque | Mar. 27, 1934 |
| 2,077,227 | Bethune | Apr. 13, 1937 |
| 2,130,644 | Hammer et al. | Dec. 20, 1938 |
| 2,238,373 | Rogers | Apr. 15, 1941 |
| 2,452,260 | Peebles | Oct. 26, 1948 |
| 2,492,635 | Hawk | Dec. 27, 1949 |

FOREIGN PATENTS

| Number | Country | Date |
| --- | --- | --- |
| 42,241 | Great Britain | Mar. 21, 1933 |